US009310944B2

(12) United States Patent
Trend et al.

(10) Patent No.: US 9,310,944 B2
(45) Date of Patent: Apr. 12, 2016

(54) ONCELL SINGLE-LAYER TOUCH SENSOR

(71) Applicants: Matthew Trend, Fareham (GB); Gareth Jones, Ringwood (GB)

(72) Inventors: Matthew Trend, Fareham (GB); Gareth Jones, Ringwood (GB)

(73) Assignee: Atmel Corporation, San Jose, CA (US)

( * ) Notice: Subject to any disclaimer, the term of this patent is extended or adjusted under 35 U.S.C. 154(b) by 126 days.

(21) Appl. No.: 13/951,300

(22) Filed: Jul. 25, 2013

(65) Prior Publication Data

US 2015/0029129 A1    Jan. 29, 2015

(51) Int. Cl.
*G06F 3/045*    (2006.01)
*G06F 3/044*    (2006.01)
*G06F 3/041*    (2006.01)

(52) U.S. Cl.
CPC .............. *G06F 3/044* (2013.01); *G06F 3/0416* (2013.01); *G06F 2203/04103* (2013.01)

(58) Field of Classification Search
CPC .................. G06F 3/044; G06F 3/0416; G06F 2203/04103
USPC ........................................................ 345/174
See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2009/0315854 | A1 | 12/2009 | Matsuo |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2013/0076612 | A1 | 3/2013 | Myers |
| 2013/0127775 | A1* | 5/2013 | Yilmaz et al. ................. 345/174 |

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Gustavo Polo
(74) *Attorney, Agent, or Firm* — Baker Botts L.L.P.

(57) ABSTRACT

In one embodiment, a touch sensor includes multiple first electrodes along a first direction. Each of the first electrodes includes multiple first conductive regions. The touch sensor also includes multiple second electrodes along a second direction that is substantially perpendicular to the first direction. Each of the second electrodes includes one second conductive region. The one second conductive region of each of the second electrodes are interdigitated with one of the first conductive regions of each of the first electrodes. The first and second conductive regions are disposed on a layer on or within a display stack including one or more layers.

20 Claims, 3 Drawing Sheets

ONCELL SINGLE-LAYER TOUCH SENSOR

TECHNICAL FIELD

This disclosure generally relates to touch sensors.

BACKGROUND

An array of conductive drive and sense electrodes may form a mutual-capacitance touch sensor having one or more capacitive nodes. The mutual-capacitance touch sensor may have either a two-layer configuration or single-layer configuration. In a single-layer configuration, drive and sense electrodes may be disposed in a pattern on one side of a substrate. In such a configuration, a pair of drive and sense electrodes capacitively coupled to each other across a space or dielectric between electrodes may form a capacitive node.

In a single-layer configuration for a self-capacitance implementation, an array of vertical and horizontal conductive electrodes may be disposed in a pattern on one side of the substrate. Each of the conductive electrodes in the array may form a capacitive node, and, when an object touches or comes within proximity of the electrode, a change in self-capacitance may occur at that capacitive node and a controller may measure the change in capacitance as a change in voltage or a change in the amount of charge needed to raise the voltage to some pre-determined amount.

In a touch-sensitive display application, a touch screen may enable a user to interact directly with what is displayed on a display underneath the touch screen, rather than indirectly with a mouse or touchpad. A touch screen may be attached to or provided as part of, for example, a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch screen.

DESCRIPTION OF EXAMPLE EMBODIMENTS

Figure 1:
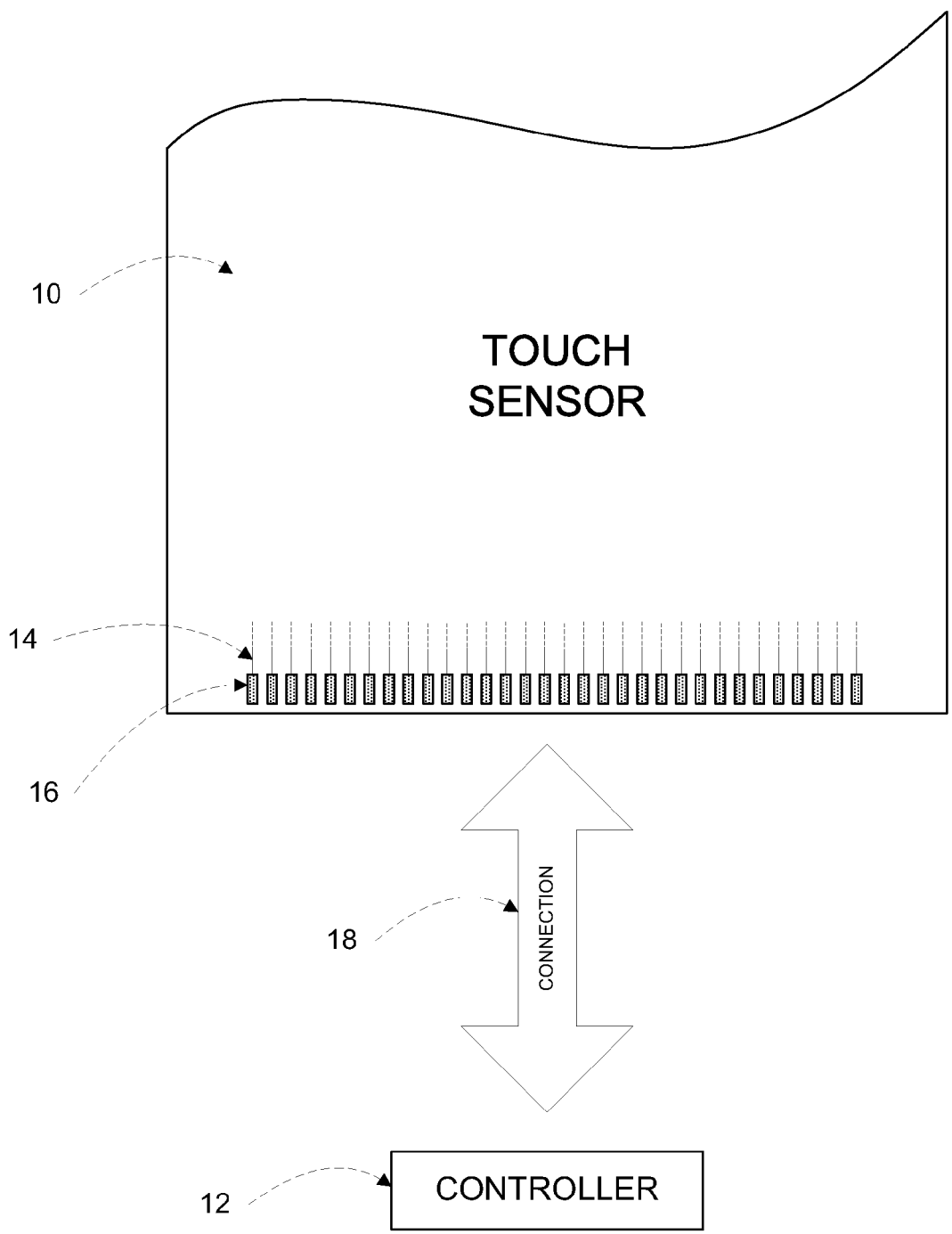
FIG. 1 illustrates an example touch sensor with an example controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of an optically clear conductive material, such as for example indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 $\mu$m or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2A:
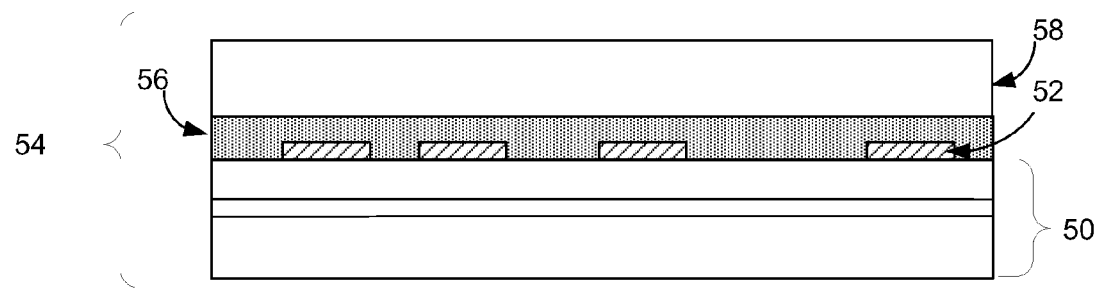
FIGS. 2A-B illustrate example mechanical stacks with an example electrodes disposed on an example display stack.
Figure 2B:
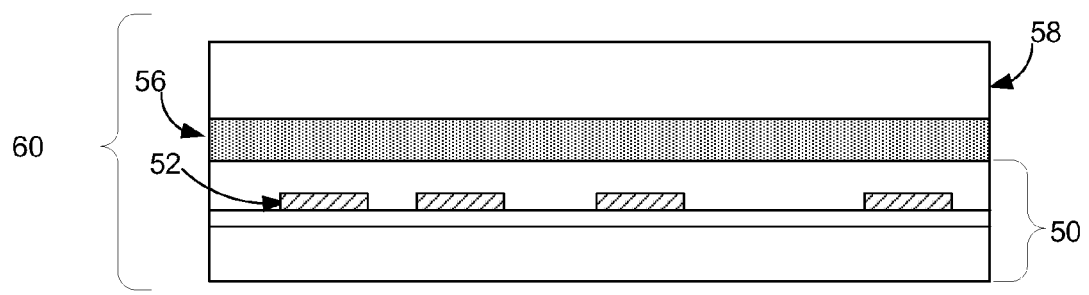

FIGS. 2A-B illustrate example mechanical stacks with an example electrodes disposed on an example display stack. Although this disclosure illustrates and describes particular mechanical stacks with particular configurations of particular layers, this disclosure contemplates any suitable mechanical stack with any suitable configuration of any suitable layers. In particular embodiments, a display stack 50 may include one or more layers associated with displaying an image to a user. As an example and not by way of limitation, display stack 50 may include a layer with elements that apply signals to pixels of the display and a cover layer. In the example of FIG. 2A, conductive material 52 forming the drive and sense electrodes of the touch sensor is disposed on the cover layer of display stack 50, such that display stack 50 functions as the substrate for conductive material 52. Mechanical stack 54 includes an adhesive layer 56, such as for example a liquid OCA (LOCA) layer, disposed between cover panel 58 and display stack 50.

In the example of FIG. 2B, conductive material 52 forming the drive and sense electrodes of the touch sensor may be disposed within display stack 50, such that a layer of display stack 50, other than the cover layer, functions as the substrate, or substrate layer, for conductive material 52. In particular embodiments, display stack 50 may include one or more layers with an optical function that modifies an optical property of light originating underneath the substrate layer. Conductive material 52 may be disposed on a layer of display stack 50 with an optical function that modifies an optical property of light originating underneath that substrate layer. As an example and not by way of limitation, display stack 50 may include a layer that polarizes light originating underneath that layer, e.g. a polarizer layer, and conductive material 52 may be disposed on the polarizer layer. As another example, a layer of display stack 50 may attenuate particular color components of light originating underneath that layer, i.e. a color filter layer, and conductive material 52 may be disposed on the color filter layer. Conductive material 52 may be situated between the remaining layers of display stack 50, such as for example a cover layer of display stack 50, and the layer of display stack 50 on which conductive material 24 is disposed, such as for example the polarizer layer. Mechanical stack 60 may include adhesive layer 56, such as for example a LOCA layer, disposed between cover panel 58 and display stack 50.

Figure 3:
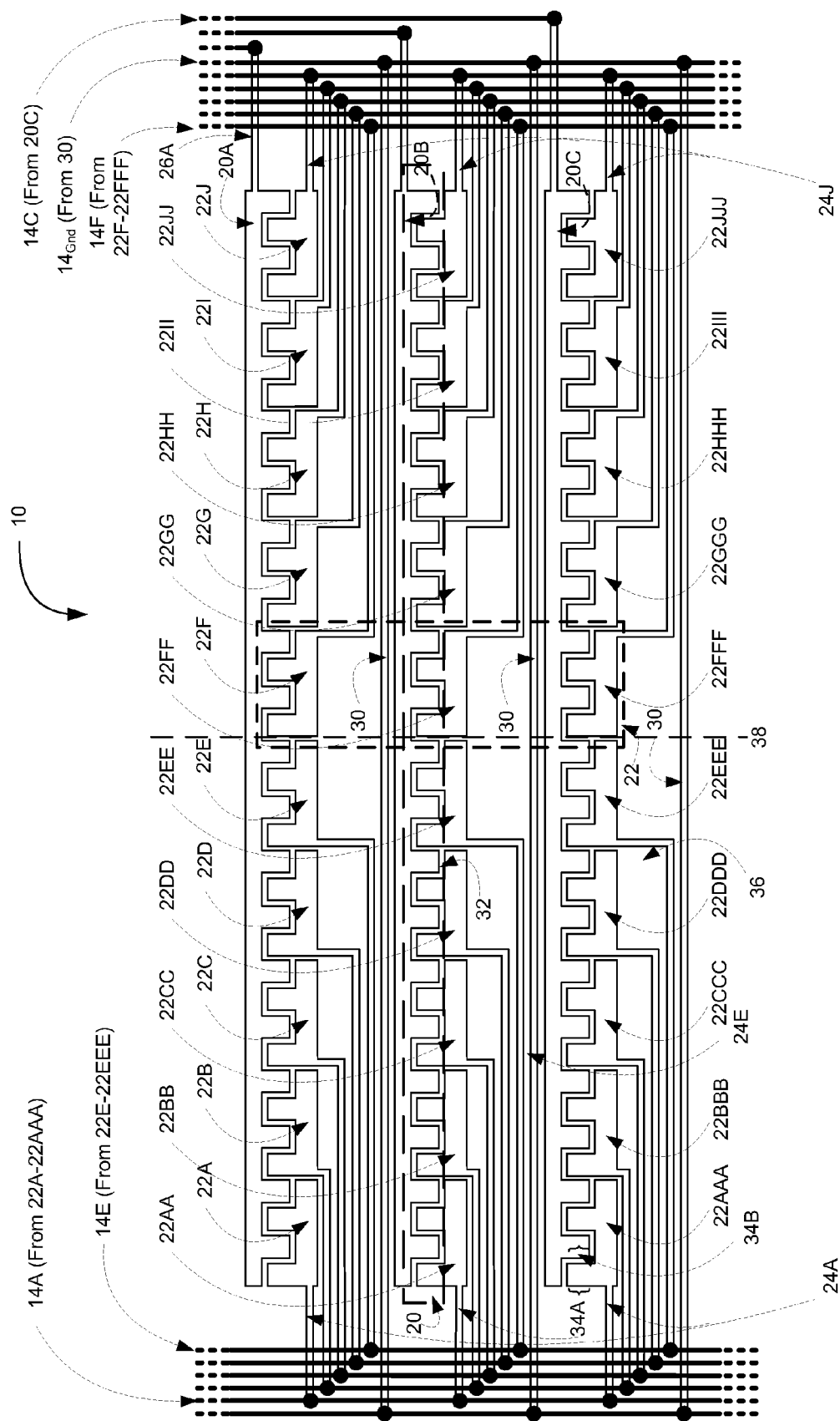
FIG. 3 illustrates an example single-layer touch sensor for use with the mechanical stacks of FIGS. 2A-B.

FIG. 3 illustrates an example single-layer touch sensor for use with the mechanical stacks of FIGS. 2A-B. Although this disclosure illustrates and describes a particular touch sensor with a particular configuration of particular electrodes and conductive regions, this disclosure contemplates any suitable touch sensor with any suitable configuration of any suitable electrodes and conductive regions. In the example of FIG. 3, touch sensor 10 includes an array of one or more drive electrodes 20 defined by conductive regions 20A-C and one or more sense electrodes 22 defined by conductive regions 22A-JJJ that in turn define a touch-sensitive area of touch sensor 10. A row of the array each includes a conductive region 20A-C defining drive electrodes 20 extending along an axis corresponding to the row of the array. Each row also includes one or more conductive regions 22A-JJJ disposed in parallel to each other that define sense electrodes 22 and are adjacent to corresponding drive electrodes 20 defined by conductive regions 20A-C. As an example and not by way of limitation, a row of the array includes drive electrode 20 defined by conductive region 20A with corresponding conductive regions 22A-J of sense electrodes 22 disposed along an axis parallel to the drive electrode defined by conductive region 20A. One or more conductive regions 22A-JJJ of the sense electrodes 22 commonly coupled to a track, e.g., 14A, 14E, 14C, and 14F may define columns that are substantially perpendicular to rows of the array. As an example and not by way of limitation, conductive regions 22F-FFF of sense electrodes 22 commonly coupled to track 14F may define a column of the array. As discussed above, each conductive region 20A-C of drive electrodes 20 may be capacitively coupled to one or more adjacent conductive regions 22A-JJJ of sense electrodes 22 that are separated by a gap 32.

A ground shape 30 extends along an axis parallel to the rows of the array and separate conductive regions 22A-JJJ of sense electrodes 22 of one row from conductive regions 20A-C of drive electrodes 20 of a different row. Ground shape 30 may serve to suppress unintentional capacitive coupling between adjacent rows of conductive regions (e.g. 20A or 22 J), or between electrode connections and adjacent electrodes (e.g. 20 or 22). As an example and not by way of limitation, ground shape 30 suppresses capacitive coupling between conductive regions 22AA-JJ defining sense electrodes 22 and conductive region 20C defining drive electrode 20, or between electrode connection 24E and conductive region 20C.

In particular embodiments, the conductive material of a conductive region (e.g. 22A and 20C) may occupy approximately 100% of the area of its shape. As an example and not by way of limitation, one or more conductive regions (e.g. 22A and 20C), or electrode connectors (e.g. 24J) may be made of ITO and the ITO of conductive regions (e.g., 22A and 20C) that define the drive 20 and sense 22 electrodes may occupy approximately 100% of the area of its shape, where appropriate. In particular embodiments, the conductive material of a conductive region (e.g. 22A and 20C) may occupy approximately 5% of the area of its shape. As an example and not by way of limitation, a conductive region (e.g. 22A and 20C) may be made of fine lines of metal (such as for example copper, silver, or a copper- or silver-based material) or other conductive material and the fine lines of conductive material may occupy approximately 5% of the area of its shape in a hatched or other suitable pattern.

In particular embodiments, one or more conductive regions 20A-C and 22A-JJJ may include projections 34A-B from a main electrode portion. Projections 34A of conductive regions 22A-JJJ of sense electrodes 22 may be adjacent to a projection 34B of corresponding conductive regions 20A-C of drive electrodes 20, thereby forming capacitive coupling edges separated by a gap 32. Projections 34A-B may be interleaved or interdigitated to increase the number of capacitive coupling edges between one or more sense electrodes 22 and a corresponding drive electrode 20. As an example and not by way of limitation, projections 34A of conductive regions 22CCC and 22GGG of sense electrode 20 may be interdigitated with projections 34B of corresponding conductive region 20C of drive electrode 20. Capacitive coupling between sense electrode and corresponding drive electrode may be determined by dimensions of gap 32 and edges of projections 34A-B of the electrodes.

Conductive regions (e.g. 20A-C and 22A-JJJ) defining a drive electrode 20 or a sense electrode 22 may be an area of conductive material forming a shape, such as for example a disc, square, rectangle, other suitable shape, or suitable combination of these. In particular embodiments, one or more edges of conductive regions (e.g. 22A or 20C) may have non-linear macro-features to avoid long linear stretches of conductive material with a repeat frequency, thereby reducing a probability of causing interference or moiré patterns. The non-linear edges of the macro-features of conductive regions (e.g. 22A or 20C) may disperse and hence reduce the visibility of reflections from the conductive material when illuminated by incident light. As an example and not by way of limitation, the edges of conductive regions (e.g. 22A or 20C) may have a substantially sinusoidal shape. Although this disclosure describes edges of the macro-features of the conductive regions having a particular type of path, this disclosure contemplates one or more edges of the macro-features of the conductive regions following any variation in line direction or path from a straight line, including, but not limited to, wavy lines or zig-zag lines. Moreover, although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes or the means of electrically isolating or physically separating the shapes from each other) may constitute in whole or in part one or more micro-features of the touch sensor.

Conductive regions 20A-C of drive electrodes 20 and conductive regions 22A-JJJ of sense electrodes 22 may be coupled to tracks, e.g., 14A, 14C, and 14F through electrode connections, e.g., 24A and 24J. In particular embodiments, conductive regions 20A-C of drive electrodes 20, conductive regions 22A-JJJ of sense electrodes 22, and electrode connectors, e.g., 24A and 24J, may be formed using a single conductive layer. In other particular embodiments, connections from conductive regions 22A-JJJ of sense electrodes 22 to corresponding tracks, e.g., 14A and 14C, may be determined based on a position relative to axis 38, provided as an illustration and not by way of limitation. As an example and not by way of limitation, conductive region sense 22EE may be left of axis 38 and on this basis, conductive region 22EE may be coupled to track 14E on a left side of the array. Similarly, conductive region 22FF may be located to the right of axis 38 and may be coupled to track 14F on a right side of the array. As described above, conductive regions, such as for example 22A-AAA, of sense electrodes 22 may be commonly coupled to track 14A. In particular embodiments, conductive regions 20A-C of drive electrodes 20 and ground lines 30 may be continuous across the length of the rows of the array. As an example and not by way of limitation, conductive region 20C may be coupled to a track 14C on either side of the array, while ground connections 30 may be coupled to tracks $14_{Gnd}$ on both sides of the array. In other particular embodiments, tracks, e.g., 14A and 14C, may be located on a different vertical level than electrode connectors, e.g., 24A and 26A. As described above, the controller transmits drive signals to drive electrodes 20 and receives sensing signals from sense electrodes 22 through tracks, e.g. 14A, 14C, 14E, and 14F, to determine the position of the object adjacent touch sensor 10.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising:
a plurality of first electrodes along a first direction, each of the first electrodes comprising a plurality of first conductive regions; and
a plurality of second electrodes along a second direction that is substantially perpendicular to the first direction, each of the second electrodes comprising one second conductive region, the one second conductive region of each of the second electrodes being interdigitated with one of the first conductive regions of each of the first electrodes in a manner such that the second electrode does not intersect in a touch sensitive area the plurality of first electrodes, the first and second conductive regions being disposed on a layer on or within a display stack comprising one or more layers.

2. The touch sensor of claim 1, wherein:
each of the first electrodes is a sense electrode of the touch sensor;
each of the first conductive regions is a conductive region of the sense electrodes of the touch sensor;
each of the second electrodes is a drive electrode of the touch sensor; and
each of the second conductive is a conductive region of the drive electrodes of the touch sensor.

3. The touch sensor of claim 1, wherein:
each of the first electrodes is a drive electrode of the touch sensor;
each of the first conductive regions is a conductive region of the drive electrodes of the touch sensor;
each of the second electrode lines is a sense electrode of the touch sensor; and
each of the second electrodes is a conductive region of the sense electrodes of the touch sensor.

4. The touch sensor of claim 1, wherein each of the first and second conductive regions comprises an extent along the second direction and one or more projections from its extent along the first direction, the one or more projections of the first conductive regions capacitively couple to the one or more projections of the second conductive regions.

5. The touch sensor of claim 1, wherein one or more edges of a macro-feature of one or more conductive regions follows a non-linear path.

6. The touch sensor of claim 1, wherein one or more of the conductive regions is made of optically clear conductive material that substantially fills the conductive region.

7. The touch sensor of claim 6, wherein the optically clear conductive material is indium tin oxide (ITO).

8. The touch sensor of claim 1, wherein one or more of the conductive regions is made of a conductive mesh of conductive material comprising gold, aluminum, copper, silver, gold-based, aluminum-based, silver-based, or copper-based, or carbon nanotubes.

9. The touch sensor of claim 1, wherein a substrate on which the plurality of first and second electrodes are disposed has an optical function modifying an optical property of light.

10. The touch sensor of claim 9, wherein the optical function comprises color filtering.

11. A device comprising:
a display stack comprising a plurality of layers, the plurality of layers comprising a cover layer and one or more other layers;
a touch sensor comprising:
a plurality of first electrodes along a first direction, each of the first electrodes comprising a plurality of first conductive regions; and
a plurality of second electrodes along a second direction that is substantially perpendicular to the first direction, each of the second electrodes comprising one second conductive region, the one second conductive region of each of the second electrodes being interdigitated with one of the first conductive regions of each of the first electrodes, the first and second conductive regions being disposed on a substrate, the substrate being a particular one of the plurality of layers, other than the cover layer, within the display stack; and
one or more computer-readable non-transitory storage media embodying logic that is configured when executed to control the touch sensor.

12. The device of claim 11, wherein:
each of the first electrodes is a sense electrode of the touch sensor;
each of the first conductive regions is a conductive region of the sense electrodes of the touch sensor;
each of the second electrodes is a drive electrode of the touch sensor; and
each of the second conductive is a conductive region of the drive electrodes of the touch sensor.

13. The device of claim 11, wherein:
each of the first electrodes is a drive electrode of the touch sensor;

each of the first conductive regions is a conductive region of the drive electrodes of the touch sensor;

each of the second electrode lines is a sense electrode of the touch sensor; and each of the second electrodes is a conductive region of the sense electrodes of the touch sensor.

14. The device of claim 11, wherein each of the first and second conductive regions comprises an extent along the second direction and one or more projections from its extent along the first direction, the one or more projections of the first conductive regions capacitively couple to the one or more projections of the second conductive regions.

15. The device of claim 11, wherein one or more edges of a macro-feature of one or more conductive regions follows a non-linear path.

16. The device of claim 11, wherein one or more of the conductive regions is made of optically clear conductive material that substantially fills the conductive region.

17. The device of claim 16, wherein the optically clear conductive material is indium tin oxide (ITO).

18. The device of claim 11, wherein one or more of the conductive regions is made of a conductive mesh of conductive material comprising gold, aluminum, copper, silver, gold-based, aluminum-based, silver-based, or copper-based, or carbon nanotubes.

19. The device of claim 11, wherein the substrate on which the first and second conductive regions are disposed has an optical function modifying an optical property of light.

20. The device of claim 19, wherein the optical function comprises color filtering.

* * * * *